US010073632B2

(12) United States Patent
Hasegawa et al.

(10) Patent No.: US 10,073,632 B2
(45) Date of Patent: *Sep. 11, 2018

(54) RECALLING FILES STORED ON A TAPE

(71) Applicant: International Business Machines Corporation, Armonk, NY (US)

(72) Inventors: Tohru Hasegawa, Tokyo (JP); Hiroshi Itagaki, Yokohama (JP); Sosuke Matsui, Tokyo (JP); Shinsuke Mitsuma, Tokyo (JP); Tsuyoshi Miyamura, Yokohama (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/798,693

(22) Filed: Oct. 31, 2017

(65) Prior Publication Data
US 2018/0059961 A1 Mar. 1, 2018

Related U.S. Application Data

(63) Continuation of application No. 15/245,780, filed on Aug. 24, 2016.

(51) Int. Cl.
*G06F 3/06* (2006.01)
*G11B 5/008* (2006.01)
*G11B 5/55* (2006.01)

(52) U.S. Cl.
CPC .......... *G06F 3/0613* (2013.01); *G06F 3/0643* (2013.01); *G06F 3/0653* (2013.01);
(Continued)

(58) Field of Classification Search
CPC .... G06F 3/0613; G06F 3/0643; G06F 3/0653; G06F 3/0659; G06F 3/0686; G11B 5/00813; G11B 5/5504
See application file for complete search history.

(56) References Cited

U.S. PATENT DOCUMENTS

2012/0110257 A1 5/2012 Enohara et al.
2014/0025911 A1 1/2014 Sims et al.
(Continued)

FOREIGN PATENT DOCUMENTS

JP 2016099728 A 5/2016

OTHER PUBLICATIONS

"Drive performance"; IBM Knowledge Center; Printed Jun. 14, 2016; 3 pages; <http://www.ibm.com/support/knowledgecenter/en/STQRQ9/com.ibm.storage.ts4500.doc/ts4500_ipg_3584_ircc4.html>.
(Continued)

*Primary Examiner* — Michael Alsip
(74) *Attorney, Agent, or Firm* — Brian M. Restauro; A. Imtiaz Billah

(57) ABSTRACT

The time required for recalling the file is reduced when the file is written in a mounted plurality of tapes in comparison to recalling the file when written in a non-mounted plurality of tapes. In the non-mounted state, criteria does not typically exist in order to recall the written file within the plurality of tapes. Embodiments of the present invention provide systems and methods for recalling files based on criteria which considers: the mounted state of a tape; the type of tape; the type of available tape drive; the number of files included in a tape; and the location of the written file in a tape.

1 Claim, 6 Drawing Sheets

(52) U.S. Cl.
CPC .......... *G06F 3/0659* (2013.01); *G06F 3/0686* (2013.01); *G11B 5/00813* (2013.01); *G11B 5/5504* (2013.01)

(56) References Cited

U.S. PATENT DOCUMENTS

| | | |
|---|---|---|
| 2015/0062733 A1 | 3/2015 | Ashida et al. |
| 2015/0205532 A1 | 7/2015 | Ashida et al. |
| 2016/0062671 A1 | 3/2016 | Iwasaki et al. |
| 2016/0117259 A1 | 4/2016 | Hasegawa et al. |
| 2016/0139824 A1 | 5/2016 | Hasegawa et al. |
| 2017/0075771 A1 | 3/2017 | Matsui et al. |
| 2017/0083437 A1 | 3/2017 | Hasegawa et al. |
| 2017/0131950 A1 | 5/2017 | Hasegawa et al. |

OTHER PUBLICATIONS

Hasegawa et al., "Recalling Files Stored on a Tape", U.S. Appl. No. 15/245,780, filed Aug. 24, 2016, 26 pages.
Hasegawa et al., "Recalling Files Stored on a Tape", U.S. Appl. No. 15/407,277, filed Jan. 17, 2017, 22 pages.
Hasegawa et al., "Recalling Files Stored on a Tape", U.S. Appl. No. 15/798,617, filed Oct. 31, 2017, 22 pages.

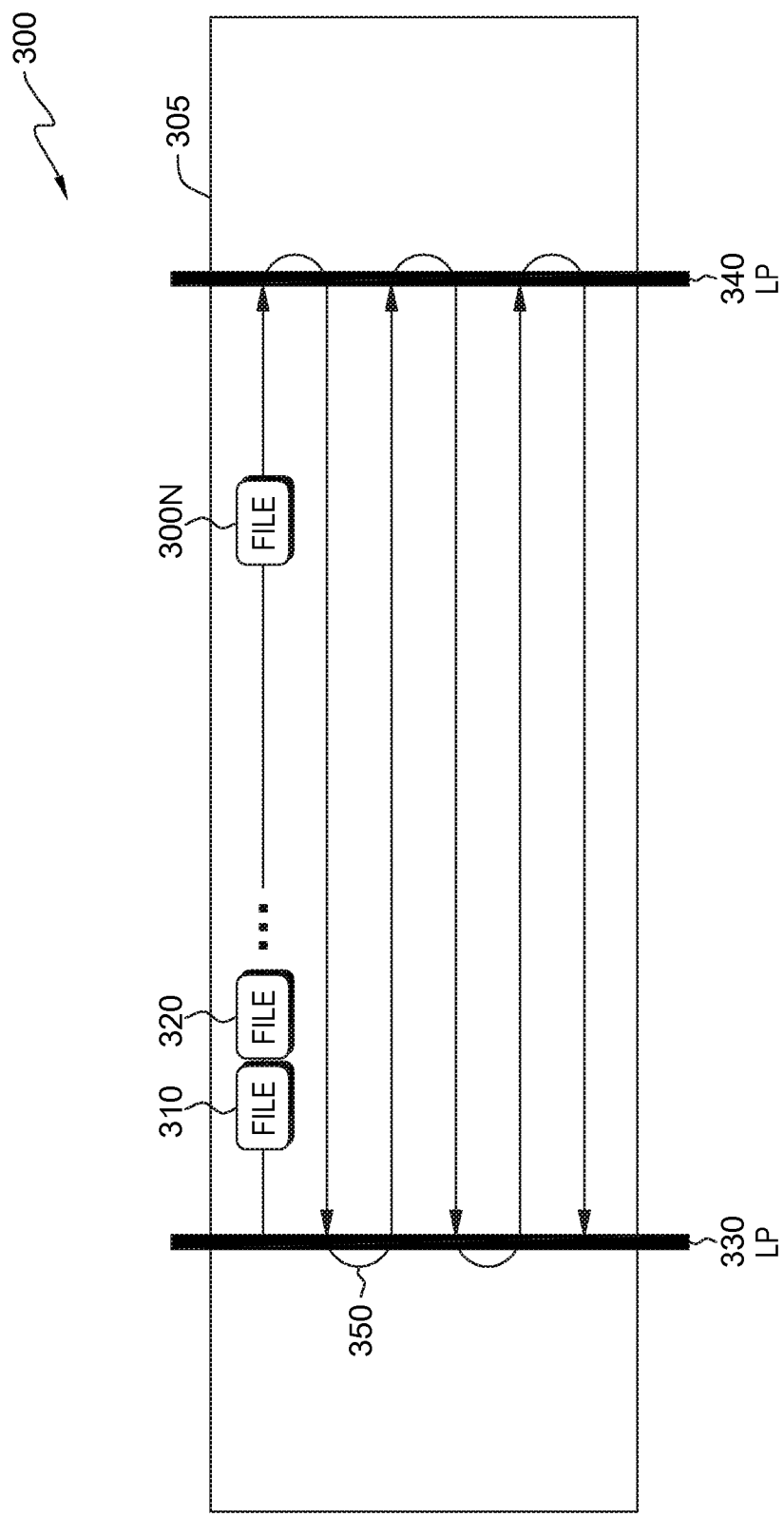

RECALLING FILES STORED ON A TAPE

BACKGROUND OF THE INVENTION

The present invention relates generally to the field of data storage and more specifically to identifying a tape of interest among a plurality of tapes.

The Linear Tape File System (LTFS) is a standard format for storing files in a tape. Vendors are involved in the development of software that realizes accesses to a tape conforming to the LTFS format via the interface of the file system. There are existing products which incorporate LTFS technology. Application programs which use a hard disk drive (HDD) can be used without modifications to the application programs as such. In the meanwhile, situations arise where: (i) an application program in a computing system intends to eventually use an HDD; (ii) the HDD may be in actual use; and (iii) an application program runs on an as-is basis by products incorporating LTFS technology. In these situations, a longer time than typically expected is required for the computer system to access files. In some cases, the access to the file may be timed out by the application program.

SUMMARY

According to one embodiment of the present invention, a method for recalling a file is provided. The method comprises: recording, by one or more processors, a file within a plurality of storage media; calculating, by one or more processors, an expected reading time to read the file for each component within the plurality of storage media in which the file is recorded, wherein the expected reading time includes a time required for mounting the component loaded in a drive; and identifying, by one or more processors, the component to be used for reading the file, wherein the identified component has the lowest expecting reading time among the plurality of storage media.

Another embodiment of the present invention provides a computer program product for recalling a file based on the method above.

Another embodiment of the present invention provides a computer system for recalling a file based on the method above.

BRIEF DESCRIPTION OF THE DRAWINGS

FIG. 3 is a diagram depicting the location of data on a tape, in accordance with an embodiment of the present invention;

DETAILED DESCRIPTION

Figure 1:
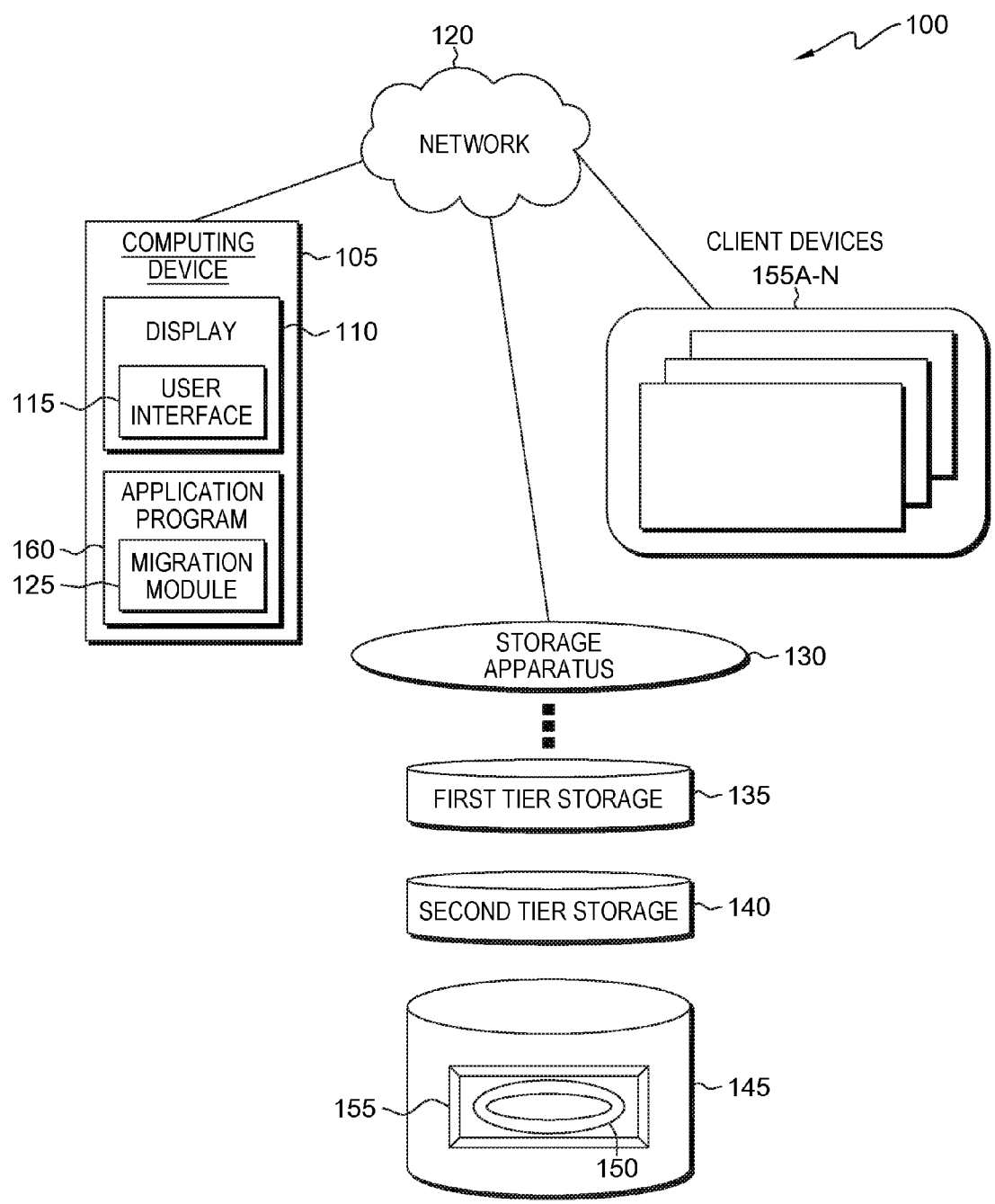
FIG. 1 is a functional block diagram illustrating a hierarchical storage system, in accordance with an embodiment of the present invention.

Instead of directly using files on the product incorporating LTFS, a hierarchical storage management (HSM) may be configured as a high-speed storage such as HDD and SSD serving as the primary storage and the products incorporating LTFS serving as the secondary storage. Another type of product utilizes HSM in conjunction with LTFS, wherein HDD is the primary storage and the product incorporating LTFS is the second storage. Herein, the product incorporating LTFS is referred to as LTFS-P and the product utilizing HSM is referred to as LTFS-H. LTFS-H is designed to efficiently handle processes for systems containing tapes, wherein the tape is already placed in a mounted state in the tape drive while contained in a case/cartridge. A file written in a plurality of tapes may be recalled from any one of the tapes. When the file is recalled from the tape in the mounted state, the time required for recalling the file is reduced. This is because the recall of a file is executed when the file is necessary. The users and application programs, which need the file, wait for completion of the recall. Thus, it is desirable that the recall of the necessary file should be completed as quickly as possible when any recall occurs.

If none of the plurality of tapes, in which a file is written, is mounted, then there is not a clear criterion regarding which one of the tapes should be selected for the file to be recalled therefrom. Typically, the recall of the file is performed using the tape which has been found first by the system, based on the inventory information internally retained with regard to the tapes. As a result, when the selected tape on which the recall is performed on is based on the inventory information, a longer time for completing the recall of the selected tape is required. In general, when the file is to be read from a tape that is not mounted in the LTFS-P, then the following processing procedures are observed: (i) loading a tape from the tape library in the tape drive; (ii) mounting the tape; (iii) positioning a head of the tape drive to the location in the tape where the file resides; and (iv) reading the file in the tape. The time required, in terms of megabytes/second (MB/s), for these steps varies depending on the types of the tape drive and the types of the tape medium. For example, in the case of LTO5, the maximum time required for reading of a file is 140 MB/s, but the maximum time in the case of LTO7 is 300 MB/s. Embodiments of the present invention disclose systems and methods to allow for increasing the speed of file recall in instances where a file, which has been migrated to a plurality of tapes of a secondary storage, is to be recalled. As enabled by this invention, the recall is performed in a manner in which a tape is selected among a plurality of tapes, wherein the selected tape allows for the quickest possible recall. The quickest recall is a recall which requires the shortest span of time to process the recall request and select the appropriate tape in order to complete the recall request. The file is read in accordance with the states and the characteristics of the tapes in which the file is stored.

The present invention will now be described in detail with reference to the Figures. FIG. 1 is a functional block diagram illustrating a hierarchal storage system, generally designated 100, in accordance with one embodiment of the present invention. FIG. 1 provides only an illustration of implementation and does not imply any limitations with regard to the environments in which different embodiments may be implemented. Modifications to data processing environment 100 may be made by those skilled in the art without departing from the scope of the invention as recited by the claims. In this exemplary embodiment, data processing environment 100 includes: storage apparatus 130 and computing device 105 connected by network 120.

Network 120 can be, for example, a local area network (LAN), a wide area network (WAN) such as the Internet, or a combination of the two, and can include wired, wireless, or fiber optic connections. In general, network 120 can be any combination of connections and protocols that will support communication between computing device 105 and storage apparatus 130.

Computing device 105 includes application program 160. Computing device 105 may be a laptop computer, a tablet computer, a netbook computer, a personal computer (PC), a desktop computer, a personal digital assistant (PDA), a smart phone, a thin client, or any programmable electronic device capable of communicating with storage apparatus 130. Computing device 105 may include internal and external hardware components, as depicted and described in further detail with respect to FIG. 6.

In this exemplary embodiment, application program 160 resides within computing device 105. Application program 160 is a collection of machine readable instructions and/or data which is used to create, manage, and control certain functions of a computing system. Application program 160 can create, access, migrate, and recall a file and/or a stub file residing in the storage tiers as enabled by HSM. Migration module 125 is integrated into application program 160, wherein migration module 125 enables the methods and systems of the invention.

Migration module 125 facilitates the selection of a tape which allows for the quickest recall of a file when the file is written into a plurality of tapes (i.e., multiple units of tape 150). The quickest recall is a recall which requires the shortest span of time to process the recall request and select the appropriate tape in order to complete the recall request. Migration module 125 works in conjunction with storage apparatus 130. Migration module 125 is performed on a system containing: tiered storage levels (i.e., first tier storage 135 and second tier storage 140), a file, a stub file (which results from migrating the file), tape 150, and mounting structure 155. When a file is read in accordance with the states and the characteristics of the tapes, the following items are taken into account: (i) whether or not the tapes are placed in the mounted state; (ii) the types of tapes; (iii) the type of available tape drive; (iv) the number of files included in the tapes; and (v) the location of the file in the tapes.

Storage apparatus 130 provides a storage environment by implementing tiered data storage using HSM. Storage apparatus 130 is connected to computing device 105. In one embodiment, storage apparatus 130 allows the automated progression or demotion of data across different tiers (types) of storage devices and media. The movement of data takes place in an automated fashion with the aid of software (i.e., application program 160 and migration module 125) or embedded firmware and is assigned to the related media according to performance and capacity requirements. Implementations vary, but are classed into two broad categories: (i) pure software based implementations, which are run on general purpose processors supporting most forms of general purpose storage media (e.g., magnetic disks, tapes, and optical tapes); and (ii) embedded automated tiered storage, which is controlled by firmware as part of a closed embedded storage system such as a SAN disk array. Software Defined Storage architectures commonly include a component of tiered storage as part of their primary functions.

HSM is a data storage technique, which automatically moves data between higher cost and lower cost storage media, applied by LTFS-H. Higher-speed storage devices (e.g., hard disk drive arrays) are more expensive per byte stored than slower-speed storage devices (e.g., optical discs and tape drives). In an ideal situation, data is stored and is available on high-speed devices at all times. However, this may be prohibitively expensive for many organizations. Instead, HSM systems store the bulk of the enterprise's data on slower-speed storage devices and then copy data to higher-speed disk drives when needed. In effect, HSM turns the fast disk drives into caches for the slower-speed mass storage devices. The HSM system monitors the way data is used and determines which data can safely be moved to slower-speed devices and which data should stay on the higher-speed devices.

A stub file is a computer file which appears to a user on a disk and is immediately available for use. The stub file is actually held either in part or entirely on a different storage medium. Upon accessing a stub file, the accessed file is intercepted by a device driver software, the data is retrieved from the actual location of the stub file, the retrieved data is written to the stub file, and user access is allowed. Typically, users are unaware that the data within a stub file is stored on a different medium, even if there is a slight delay when accessing such a file. Typically, the purpose of stub files is to move data from an expensive higher-speed storage device (e.g., a computer's hard drive) to a cheaper lower-speed storage device (e.g., a tape or an electro-optical disk) while not requiring the knowledge of using specialized storage software to retrieve the data. Stub files allow a system manager to enforce the use of cheaper storage when users would prefer to store files on the highest availability and higher cost devices. Stubbing is a feature of some commercial file backups, archiving packages, and operating systems.

First tier storage 135, second tier storage 140, and tape storage 145 are components of the storage environment provided by storage apparatus 130. First tier storage 135 is the highest performing systems when implementing tiered data storage; second tier storage 140 is an intermediate level performing systems when implementing tiered data storage; and tape storage 145 is the lowest performing systems when implementing tiered data storage. The most important data is stored within first tier storage 135 while less important data is stored within second tier storage 140 and tape storage 145. Data can migrate between first tier storage 135, second tier storage 140, and tape storage 145. Migration module 125 enables more efficient recall of files from tape storage 145.

In a preferred embodiment, first tier storage 135 is a HDD; second tier storage 140 is a type of LTFS-P (which will be described in further detail with respect to the discussion of FIG. 2); and tape storage 145 is, at least in part, a library of tapes. Furthermore, the library of tapes contain tapes reminiscent of tape 150. Tape storage 145 contains mounting structure 155 to work in conjunction with one or more units of tape 150. Migration module 125 takes into consideration the position of a tape with respect to mounting structure 155.

In an exemplary embodiment, tape 150 is a magnetic tape. An information storage medium is a magnetic coating on a flexible backing in tape form. Data is recorded by magnetic encoding of tracks on the coating according to a particular tape format. Tape 150 is wound on reels (or spools). Tape 150 may be: used on its own, used as an open-reel tape, or contained in some sort of magnetic tape cartridge for protection and ease of handling. For this purpose, interchangeable standards are of minor importance and accordingly, proprietary cartridge-tape formats are widely used.

Mounting structure 155 is used in tape transport (i.e., a tape drive, tape deck, tape unit, or MTU). During the tape transport, tape 150 is moved over one or more magnetic heads. An electrical signal is applied to the write head in order to record data as a magnetic pattern on tape 150. As the recorded version of tape 150 passes over the read head, an electrical signal is generated from which the stored data can be reconstructed. The two heads may be combined into a single read/write head. There may also be a separate erase head to erase the magnetic pattern remaining from any previous use of the tape.

Figure 2A:
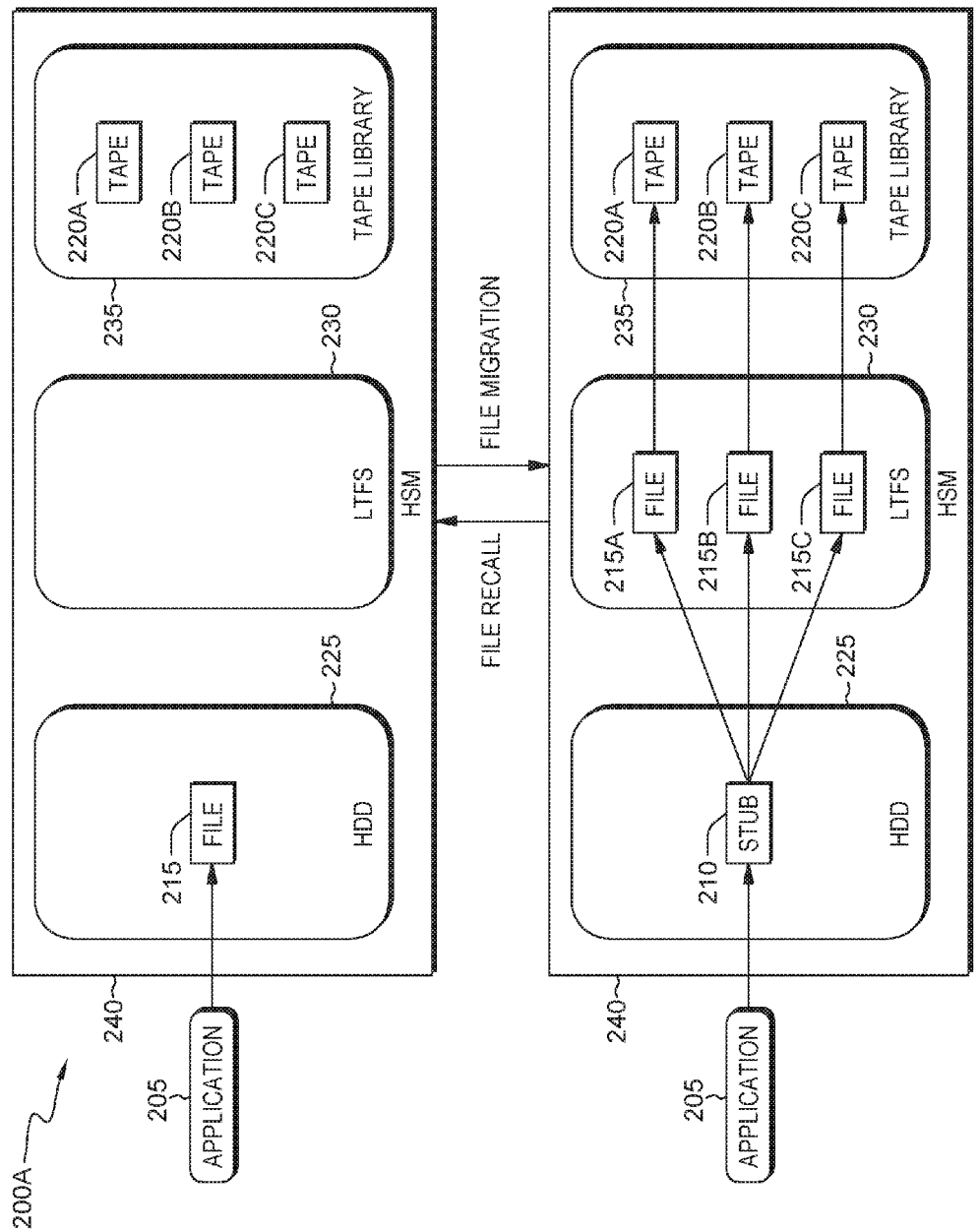
FIG. 2A is a functional block diagram depicting the migration of files, in accordance with an embodiment of the present invention.

FIG. 2A is a functional block diagram depicting the migration of files, in accordance with an embodiment of the present invention.

Environment 200A depicts the migration of files within a HSM system.

HSM systems are represented by HSM 240 and use HDD 225 as the primary storage. Application programs, such as application 205, store file 215 in HDD 225. HSM 240 is a type of LTFS-H system. File 215 will be moved to LTFS 230, which is the secondary storage, at a time when there is no access to the file 215. When file 215 is moved from HDD 225 to LTFS 230, a file called a "stub" is placed in the primary storage site HDD 225. The "stub" is stub 210 which is a file indicative of the existence of file 215. The operation of moving file 215 from primary storage to secondary storage followed by subsequent stub file creation is referred to as "file migration." As a response to accessing stub 210, file 215 is read from LTFS 230 (i.e., the secondary storage) and moved to HDD 225 (i.e., the primary storage). The operation to read file 215 from the secondary storage and move file 215 to the primary storage is referred to as "file recall."

When LTFS 230 is used as the secondary storage in HSM 240, the access to the data deriving from file 215 occurs at stub 210 in HDD 225, wherein the conditions require at the time of the recall operation to identify the tape (tapes 220A, 220B, and 220C among tape library 235) in which file 215 is stored. In view of this, HSM 240 is configured to record the correspondence between stub 210 and the tape in which the file body is stored. The methods of recording this correspondence may include: (i) storing a tape ID as one of the file attributes of stub 210; or (ii) providing a database dedicated to HSM 240 and recording the correspondence therein. In an exemplary embodiment, the correspondence involves storing the tape ID as one of the file attributes of stub 210. The tape ID is an identification uniquely assigned to the tape. In general, where HSM 240 utilizes LTFS 230 as the secondary storage, migration of file 215 may involve a plurality of tapes (tape library 235 containing tapes 220A-C) in which the tape is to be migrated. An advantageous effect of the tape ID correspondence is that the contents of file 215 have multiple copies as depicted by file 215A, file 215B, and file 215C. File 215A, file 215B, and file 215C are stored in a plurality of tapes which are associated with tape 220A, tape 220B, and tape 220C, respectively.

A plurality of tapes are used to guard against any possible damage to a single tape. HSM 240 is designed for any tape already placed in a mounted state in the tape drive in a case where file 215 is written in a plurality of tapes. Any tape can be recalled from any one of the tapes. File 215 is recalled from the tape containing file 215 while in the mounted state. Thus, the time required for recalling file 215 is reduced. The recall of file 215 is executed when the file is necessary. There may be users and application programs which may also require file 215 and accordingly, wait for the completion of the recall. The recall of file 215 should be completed as quickly as possible when any recall occurs.

In instances without the invention where none of the tapes among tape library 235, in which file 215 is written, are mounted, a clear criterion does not exist regarding which one of the tapes should be selected for file 215 to be recalled therefrom. Without the invention, the recall of file 215 is performed using the tape that has been found first based on the inventory information internally retained with regard to tape library 235. As a result, when the tape from which the file to be recalled is selected on the basis of the inventory information, it may happen that a tape may be selected which requires a long time to complete the recall. In general, if file 215 is to be read from a tape which is not mounted in the LTFS 230 type system, then the following processing procedures are observed: 1) loading a tape in the tape library in the tape drive; 2) mounting the tape; 3) positioning a head of the tape drive to the location in the tape where the file resides; and 4) reading the file in the tape. Here, the time required for the processing procedures 1 to 4 varies depending on the types of the tape drive and the types of the tape medium.

Figure 2B:
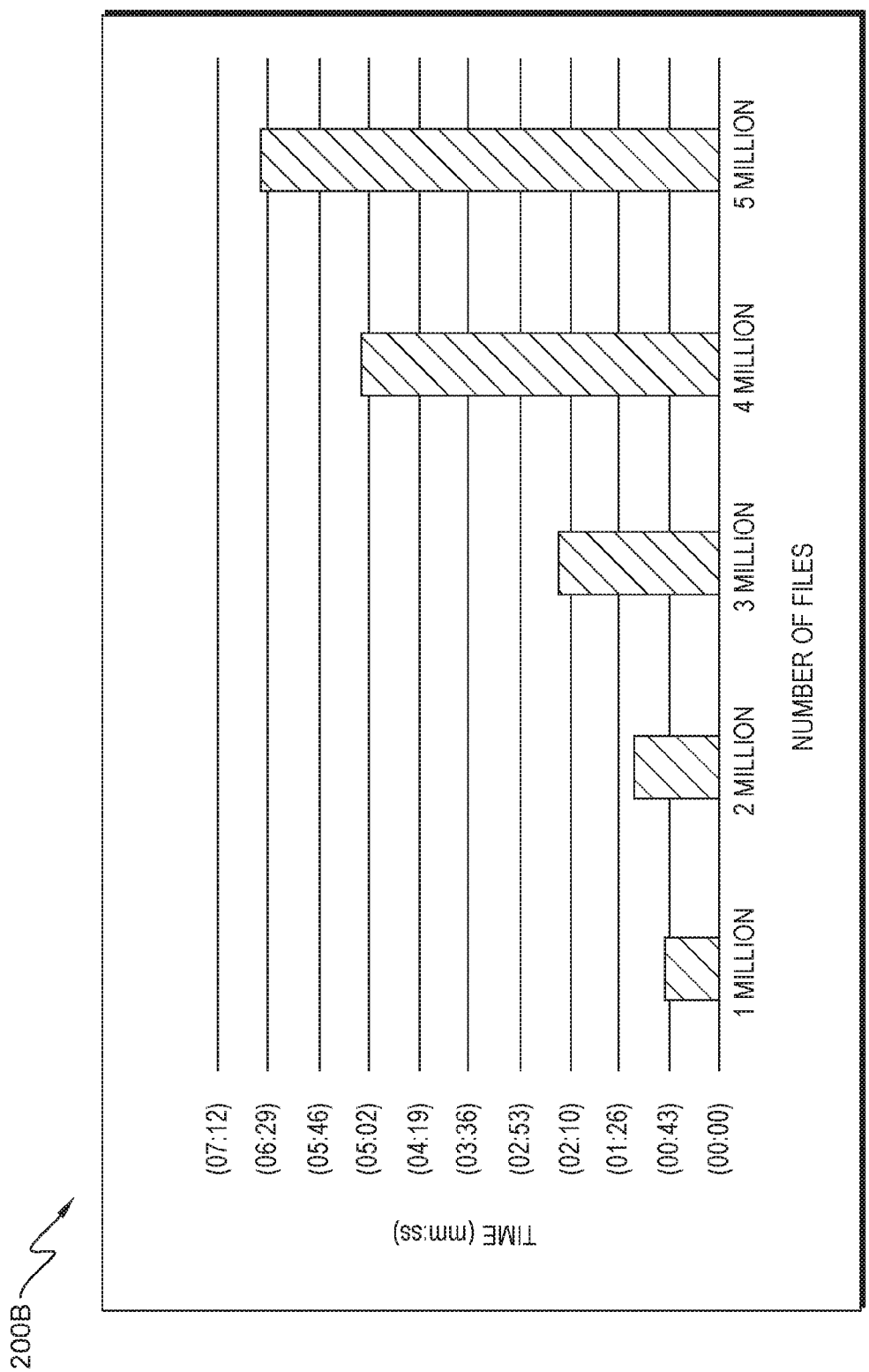
FIG. 2B is a graph depicting the mounting time required as a function of the number of files, in accordance with an embodiment of the present invention.

FIG. 2B is a graph depicting the mounting time required as a function of the number of files, in accordance with an embodiment of the present invention.

Graph 200B is a graph where: (i) the mounting time is labeled as "TIME" on the y-axis; (ii) the "TIME" on the y-axis is measured in the units of mm:ss; and (iii) the number of files is labeled as "Number of Files" on the x-axis. The mounting time required for mounting the tape depends on the numbers of files and directories stored in the tape. In an exemplary embodiment, the actual time is measured and depicts a trend of an increasing mounting time as the number of files increase. For example, one million files require a mounting time of 43 mm:ss (43 seconds); two million files require a mounting time of 1:26 mm:ss (86 seconds); three million files require a mounting time of 2:10 mm:ss (132 seconds); four million files require a mounting time of 5:02 mm:ss (302 seconds); and five million files require a mounting time of 6:29 mm:ss (389 seconds).

FIG. 3 is a block diagram depicting the location of data on a tape, in accordance with an embodiment of the present invention.

The time required, to position a head of the tape drive relative to the location in the tape where the file resides, depends on the location of the file in the tape. In the instances of tapes such as an LTO tape as contemplated in LTFS 230, the head of the tape drive travels back and forth in the depicted longitudinal direction in FIG. 3 (i.e., path 350) of tape 305 several times when data is written in tape 305. As a result, a file that has been written starting from the location near LP 330 during the commencement of data writing processes, after mounting of tape 305 requires a relatively short time for seeking. Thus, reading this type of file can be started within a short time during the commencement of data writing processes. In contrast, a file that has been written starting from a location near LP 340, which is a returning position at the end side in the longitudinal direction of tape 305, requires a relatively long time for seeking. For example, suppose that file 310 is written at a location near the LP 330 and file 300N is written at a location near the LP 340. If the head of the tape is positioned near the LP 330, then reading of file 310 can start immediately. Meanwhile, the reading of File 300N will require longer time for positioning of the head.

The present invention as enabled by migration module 125 addresses the problem that there is a need of selecting a tape which allows for the quickest possible recall of a file, when the file is written in a plurality of tapes.

Figure 4:
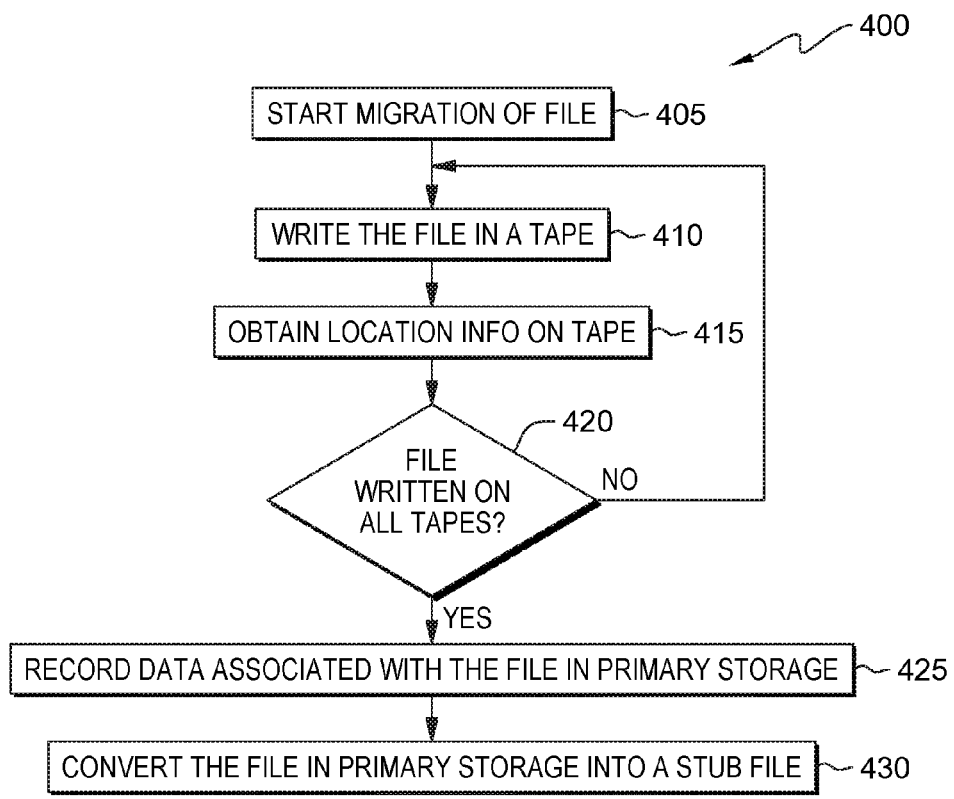
FIG. 4 is a flowchart detailing the operational steps of migrating a file, in accordance with an embodiment of the present invention.

FIG. 4 is a flowchart detailing the operational steps of migrating a file, in accordance with an embodiment of the present invention.

In this exemplary embodiment, migration module 125 performs the operational steps in flowchart 400, which can be realized by the expansion of LTFS-P. In this exemplary embodiment, when a file is written in a tape, the information, regarding the specific location of the tape of where the data is written, can be obtained as the attribute information of the file.

Specifically, as illustrated in FIG. 4, the file is first written in the tapes by the number of provisionally necessary tapes and subsequently the location information (e.g., Wrap and LPOS) on the location in the tape is recorded simultaneously with the recording of the Tape ID.

In step 405, migration module 125 starts the migration of a file. The file is moving from a primary storage site to a secondary storage site. At least part of the file has been moved from the primary storage site to the secondary storage site.

In step 410, migration module 125 writes the file in a tape. From the secondary storage site, the migrated portions of the file are written in a tape. The tape is a part of a tape library (as depicted in FIG. 2), wherein the tape library is a separate storage site from the primary storage site and the secondary site. Furthermore, file migration facilitates the writing of the file in another tape upon migration module 125 determining the file is not written in all tapes within a library of tapes.

In step 415, migration module 125 obtains location info in the tape. By implementing migration module 125 in the tape, information regarding the specific location can be realized by obtaining a wrap, which is the position in a vertical direction of the tape, and an LPOS, which is the position in a longitudinal direction of the tape from the tape drive by methods established in known in art. The number of files and directories stored in each tape must be obtainable as the extended attribute of the root directory. For example, a file is obtainable when an extended attribute ltfs.<tapeID> of the root directory is read, the total number of files, and the directories stored in a tape having that Tape ID is returned.

In step 420, migration module 125 determines if the file is written on all of the tapes within the tape library. In an exemplary embodiment, migration module 125 compares data associated with the written file on one tape to the data contents of the other tapes within the tape library. This determination is made on each tape within the tape library. If a tape contains the same data as the data associated with the written file on the one tape, then migration module 125 determines the file is written in the tape. If a tape does not contain the same data as the data associated with the written file on the one tape, then migration module 125 determines the file is not written the tape.

In step 425, migration module 125 records data associated with the file in the primary storage upon migration module 125 determining the file is written on all of the tapes within the tape library. The recorded data includes: a tape ID, a WRAP, and a LPOS as the attribute information of the file in the primary storage, wherein at least part of the file which has migrated from the primary storage to the secondary storage.

In step 430, migration module 125 converts the file in primary storage into a stub file. The stub file contains the recorded data as the stub file's attribute information. By generating the stub file, migration module 125 completes the migration of the file to the secondary storage.

Figure 5:
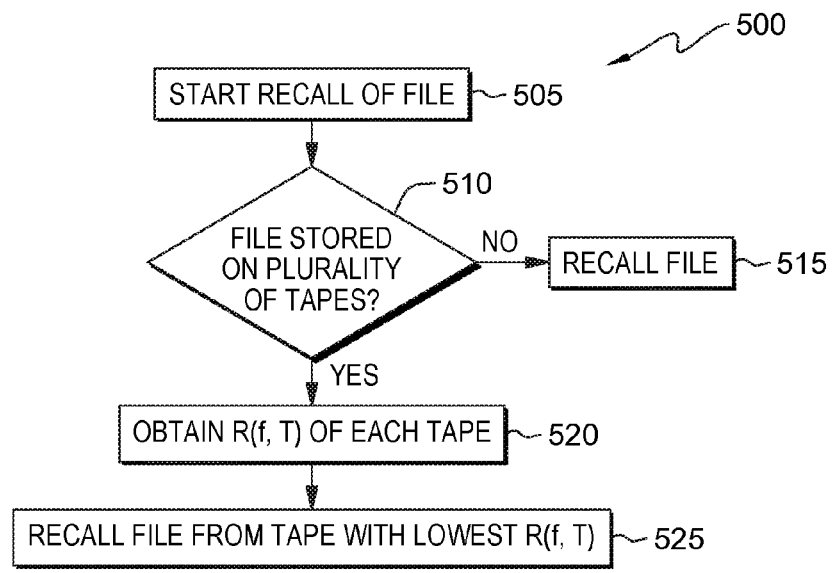
FIG. 5 is a flowchart detailing the operational steps of recalling a file, in accordance with an embodiment of the present invention.

FIG. 5 is a flowchart detailing the operational steps of recalling a file, in accordance with an embodiment of the present invention.

In this exemplary embodiment, migration module 125 performs the operational steps in flowchart 500, which can be realized by the expansion of LTFS-H. In this exemplary embodiment, when a file migrates, the location information in the tape is written to the attribute information of the stub.

In step 505, migration module 125 starts the recall of the file. The file is: (i) written in the tapes by the number of provisionally necessary tapes; and (ii) recorded the location info (i.e., WRAP and LPOS data) on the location in the tapes simultaneously with the tape ID.

In step 510, migration module 125 determines if the file is stored in a plurality of tapes. At this step, there is either a single tape or a plurality of tapes. A tape is selected among the plurality of tapes and the selected tape is examined for the file which needs to be recalled. If there is no plurality of tapes, then migration module 125 determines the file is contained within the tape. As stated above, the recall of the file takes place only if the file has been written on at least one tape. By definition, step 510 only occurs if there is a recall. This implies that there is: (i) a single tape; or (ii) a plurality of tapes. Thus, not having a plurality of tapes at step 510 is indicative of the file being contained within a single tape.

In step 515, migration module 125 recalls the file upon migration module 125 determining the file is not stored in a plurality of tapes. By induction, the file must have been stored on a single tape. The recall of the file is subsequently completed.

In step 520, migration module 125 obtains $R(f,T)$ of each tape upon migration module 125 determining the file is stored in the plurality of tapes. $R(f, T)$ is the expected reading time to read the file from a tape, and depends on whether the tape of interest is mounted or not mounted. When the tape is mounted, $R(f, T)$ is the expected time to the start of reading (as obtained by methods known in the art) from the current head position of the mounted tape (WA, LA) and the location of the file f in the tape (Wrap, LPOS). When the tape is not mounted, $R(f, T)=K(T)+M(T)+S(T, f)$ where: $K(T)$ is the time required for loading the tape T in the tape drive in the tape library; $M(T)$ is the time required for mounting the tape T; and $S(T, f)$ is the time required for seeking the location where the file f is recorded in the tape T and reading of the file f therefrom.

$K(T)$ is determined by the types of tape libraries and the type of tape drives. For example, when an LTO5 tape drive is used in a TS4500 tape library, then the time required for loading can be estimated to be approximately 12 seconds. In other words, $K(T)$ can be described as $K(T)=12(s)$.

$M(T)$ is determined by the types of the CPU and the memory of the server, the types of the tape drive, the types of the tape, and the number of files and directories stored in the tape. The elements other than the numbers of files and directories are determined at the stage of the introduction of the system as such, and only the numbers of the files and directories stored in the tape are dynamically changed in the course of the operation of the system. As a result, for example, $M(T)$ can be described as follows: $M(T)=20+N/10^6(s)$, where N is the total number of the files and directories stored in the tape T.

$S(T, f)$ can be calculated using techniques known in the art, on the basis of the tape drive, the type of the tape, and the location of the file f in the tape (Wrap, LPOS).

In step 525, migration module 125 recalls the file from a tape with the lowest R (f, T). With regard to K(T) and S(T, f), when a plurality of types of tape drives are loaded in the tape library, then K(T) and S(T, f) are calculated for all of the available tape drives. A tape drive, among those of the available tape drives, is selected with the smallest K(T)+S(T, f). The selection of the tape completes the recall of the file. As the value R(T, f) is obtained during the recall and the tape is determined in this manner, migration module 125 selects the tape from which the file can be recalled as quickly as possible and thus, complete the recall the desired file written in a plurality of tapes.

Figure 6:
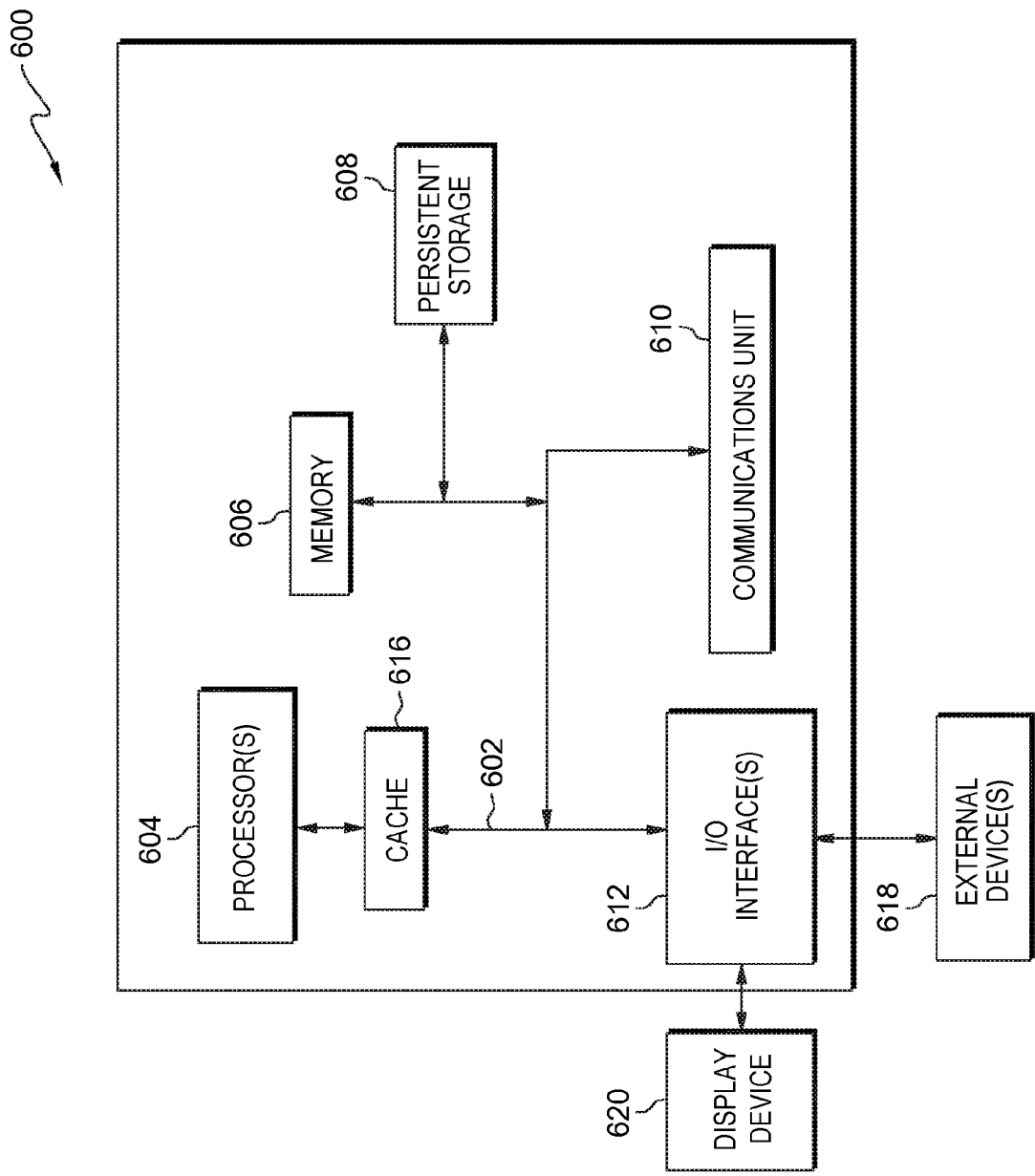
FIG. 6 depicts a block diagram of internal and external components of a computing device, in accordance with an embodiment of the present invention.

FIG. 6 depicts a block diagram of components of a computing device, generally designated 600, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media.

Program instructions and data used to practice embodiments of the present invention may be stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to computing device 600. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for recalling a file comprising:
   one or more computer processors;
   one or more non-transitory computer readable storage media; and
   program instructions stored on the one or more non-transitory computer readable storage media for execution by at least one of the one or more processors, the program instructions comprising:
   program instructions to record a file within a plurality of storage media containing at least one component;
   program instructions to calculate an expected reading time to read the file for each component within the plurality of storage media in which the file is recorded, wherein the expected reading time includes a time required for mounting each component loaded in a drive, wherein calculating the expected reading time comprises:
      determining a time required to load each component, characteristics associated with the drive, a first time required for seeking a recording location of the file on each component and for reading the file, a second time required for reading the file based, on a position in a vertical direction of the file and a position in a longitudinal direction of the file;
   responsive to migrating a file from a primary storage to a component within the plurality of storage media, program instructions to associate the vertical direction of the file and the longitudinal direction of the file on the component with an identification of the component to be utilized for reading the file, wherein the component has a lowest expected reading time among the plurality of storage media;
   program instructions to record the vertical direction and the longitudinal direction associated with the identification in the primary storage;
   program instructions to dynamically count a number of files and directories stored in each component, wherein the dynamically counted number of files is used at least in part to calculate the time required for mounting each component; and
   program instructions to utilize a component for reading the file, wherein the utilized component has the lowest expected reading time within the plurality of storage media and contains the identification of the component associated with the vertical direction of the file and the longitudinal direction of the file.

* * * * *